(12) United States Patent
Boe

(10) Patent No.: US 10,622,158 B2
(45) Date of Patent: Apr. 14, 2020

(54) CAPACITOR SYSTEM

(71) Applicant: Siemens Aktiengesellschaft, Munich (DE)

(72) Inventor: Ove Boe, Tanem (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 308 days.

(21) Appl. No.: 15/832,876

(22) Filed: Dec. 6, 2017

(65) Prior Publication Data

US 2018/0197684 A1    Jul. 12, 2018

(30) Foreign Application Priority Data

Jan. 9, 2017   (EP) ..................... 17150678

(51) Int. Cl.

| H01G 4/38 | (2006.01) |
|---|---|
| H01G 4/015 | (2006.01) |
| H02H 9/00 | (2006.01) |
| H01G 2/14 | (2006.01) |
| H01G 4/228 | (2006.01) |

(Continued)

(52) U.S. Cl.
CPC .......... *H01G 4/38* (2013.01); *H01F 27/2804* (2013.01); *H01F 37/00* (2013.01); *H01G 2/14* (2013.01); *H01G 4/224* (2013.01); *H01G 4/228* (2013.01); *H01G 4/40* (2013.01);
(Continued)

(58) Field of Classification Search
CPC .......... H01G 4/38; H01G 4/224; H01G 4/015; H01G 4/40; H01G 2/14; H01G 4/228; H01F 27/2804; H01F 2027/2809; H01F 37/00; H02H 3/08; H02H 9/001; H02H 9/002;
(Continued)

(56) References Cited

U.S. PATENT DOCUMENTS

| 2,948,852 A * | 8/1960 | Bacon ..................... G11C 11/20 |
|---|---|---|
| | | 324/174 |
| 3,231,701 A * | 1/1966 | Craig ................... H01H 85/042 |
| | | 337/246 |

(Continued)

FOREIGN PATENT DOCUMENTS

| CN | 201364821 Y | 12/2009 |
|---|---|---|
| EP | 2975621 A1 | 1/2016 |
| EP | 2985852 A1 | 2/2016 |

OTHER PUBLICATIONS

Extended European Search Report dated May 29, 2017.

*Primary Examiner* — Rexford N Barnie
*Assistant Examiner* — Terrence R Willoughby
(74) *Attorney, Agent, or Firm* — Harness, Dickey & Pierce, P.L.C.

(57) ABSTRACT

A capacitor system includes a first capacitor and a second capacitor, having essentially the same capacitance, and a current limiter. A first terminal of the first capacitor and a first terminal of the second capacitor are connectable to a first busbar. The second terminal of the first capacitor is coupled to a first terminal of the current limiter and the second terminal of the second capacitor is coupled to a second terminal of the current limiter. The current limiter has at least one third terminal connectable to a second busbar. The current limiter includes a first inductive element and a second inductive element having essentially the same inductance and being magnetically coupled with opposite polarity.

19 Claims, 2 Drawing Sheets

(51) Int. Cl.
*H01F 37/00* (2006.01)
*H01G 4/40* (2006.01)
*H01F 27/28* (2006.01)
*H01G 4/224* (2006.01)
*H02H 9/02* (2006.01)

(52) U.S. Cl.
CPC ..... *H01F 2027/2809* (2013.01); *H01G 4/015* (2013.01); *H02H 9/002* (2013.01); *H02H 9/021* (2013.01)

(58) Field of Classification Search
CPC .......... H02H 9/00; H02H 9/023; H02H 9/021; H02H 9/025; H02H 9/026

See application file for complete search history.

(56) References Cited

U.S. PATENT DOCUMENTS

| | | | | |
|---|---|---|---|---|
| 3,348,158 A | * | 10/1967 | Dennis | H03D 3/26 329/339 |
| 3,467,888 A | * | 9/1969 | Wolf | H02H 7/16 361/17 |
| 4,219,856 A | | 8/1980 | Danfors et al. | |
| 5,978,231 A | * | 11/1999 | Tohya | H01F 17/0013 361/782 |
| 6,002,593 A | * | 12/1999 | Tohya | H05K 1/0233 361/765 |
| 10,491,181 B2 | * | 11/2019 | Kishimoto | H01P 1/2002 |
| 2006/0214760 A1 | | 9/2006 | Menegoli et al. | |
| 2015/0170839 A1 | * | 6/2015 | Aarskog | H01G 2/10 361/273 |
| 2015/0357814 A1 | * | 12/2015 | Rozenshtein | H02H 9/023 505/211 |
| 2016/0358717 A1 | | 12/2016 | Newberry | |
| 2019/0013662 A1 | * | 1/2019 | Norrga | H01H 9/54 |

* cited by examiner

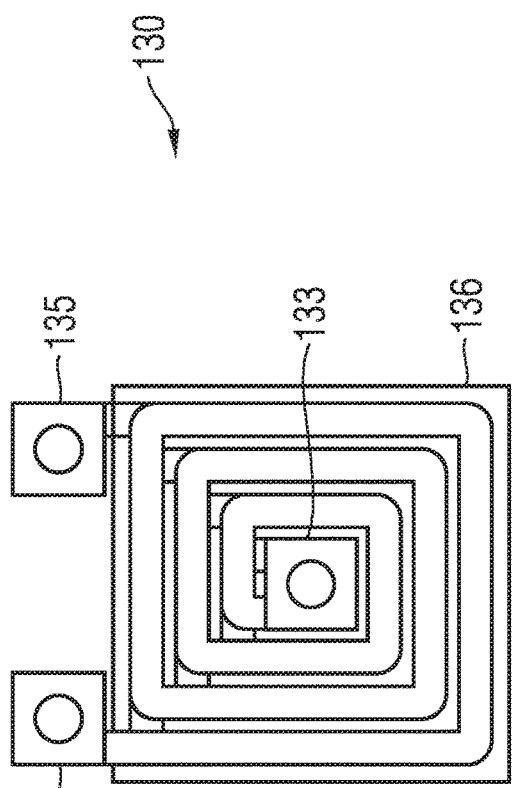
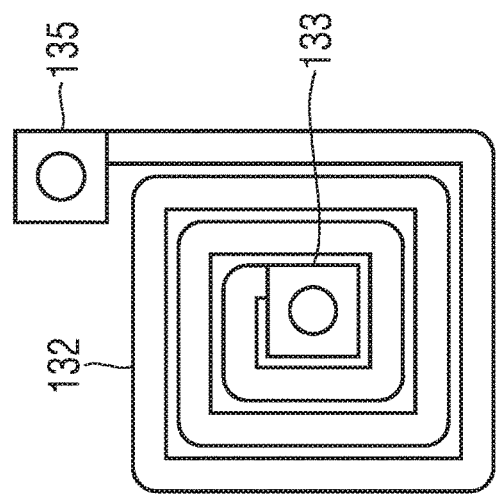
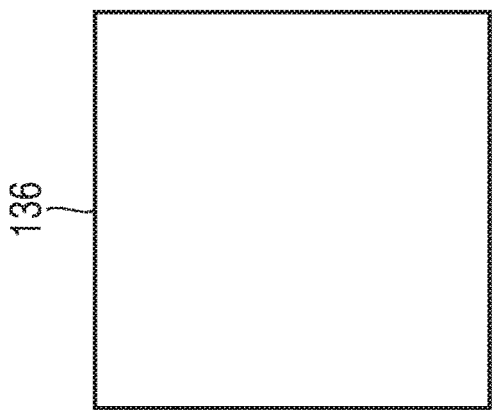
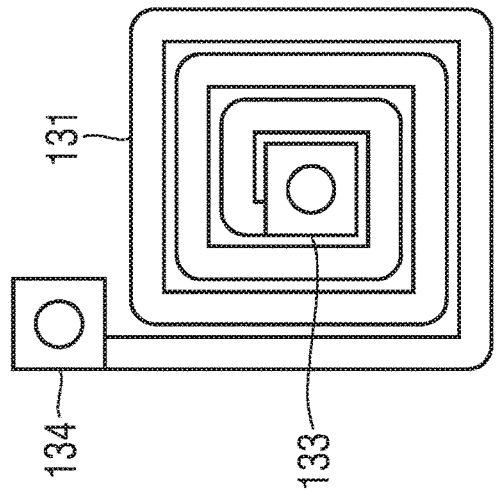

CAPACITOR SYSTEM

PRIORITY STATEMENT

The present application hereby claims priority under 35 U.S.C. § 119 to European patent application number EP 17150678.5 filed Jan. 9, 2017, the entire contents of which are hereby incorporated herein by reference.

Field

At least one embodiment of the present invention relates generally to a capacitor system and particularly to a capacitor system for subsea electrical systems.

Background

Capacitor systems are often used in energy distribution networks to provide capacitive reactive compensation and/or power factor correction. Capacitor systems are relatively inexpensive, usually easy and quick to install and can be deployed virtually anywhere in the network.

In environments where failed capacitor elements of such capacitor systems can only be retrieved and replaced at high cost, for example in subsea power grids, self-healing capacitors are an attractive design variant.

In preferred subsea installations components are immersed in a pressure compensated oil volume which is contained within a vessel or enclosure which can be of light-weight design as it does not need to withstand the high pressures encountered at water depths of several thousand meters. Pressure compensated means that the pressure inside the vessel is balanced to the ambient pressure. Thereby the ambient pressure may be very high, for example several hundred bar, but the differential pressure between the inside and the outside of the vessel or enclosure may be low, for example 0 bar to 2 bar. Thus any component of the subsea circuitry will be exposed to pressures equivalent to the high ambient water pressure.

SUMMARY

The inventors have recognized that, unfortunately, the self-healing properties of capacitors are impeded by such high pressures. In particular, self-healing capacitors are usually of the metalized film type. The film layers are pressed against each other by the pressure to which the capacitor is exposed, thereby influencing the self-healing properties considerably. In capacitor systems where many capacitors are connected in parallel the fault current being fed into a failure of a single capacitor may be too high to be handled by the self-healing mechanism and may also cause intolerable EMI to nearby components.

At least one embodiment of the present invention provides a capacitor system having means for limiting the fault current fed into any of its capacitors.

In accordance with one embodiment of the present invention, there is provided a capacitor system comprising a first capacitor and a second capacitor having essentially the same capacitance and a current limiter. A first terminal of the first capacitor and a first terminal of the second capacitor are connectable to a first busbar. The second terminal of the first capacitor is coupled to a first terminal of the current limiter and the second terminal of the second capacitor is coupled to a second terminal of the current limiter. The current limiter has at least one third terminal connectable to a second busbar and comprises a first inductive element and a second inductive element having essentially the same inductance and being magnetically coupled with opposite polarity.

At least one embodiment of the present invention relates to a subsea electrical system comprising at least one such capacitor system immersed in a pressure compensated oil volume contained within a vessel or enclosure.

BRIEF DESCRIPTION OF THE DRAWINGS

FIGS. 2A-2D are schematic illustrations of an example current limiter of an embodiment of the present invention.

DETAILED DESCRIPTION OF THE EXAMPLE EMBODIMENTS

Figure 1:
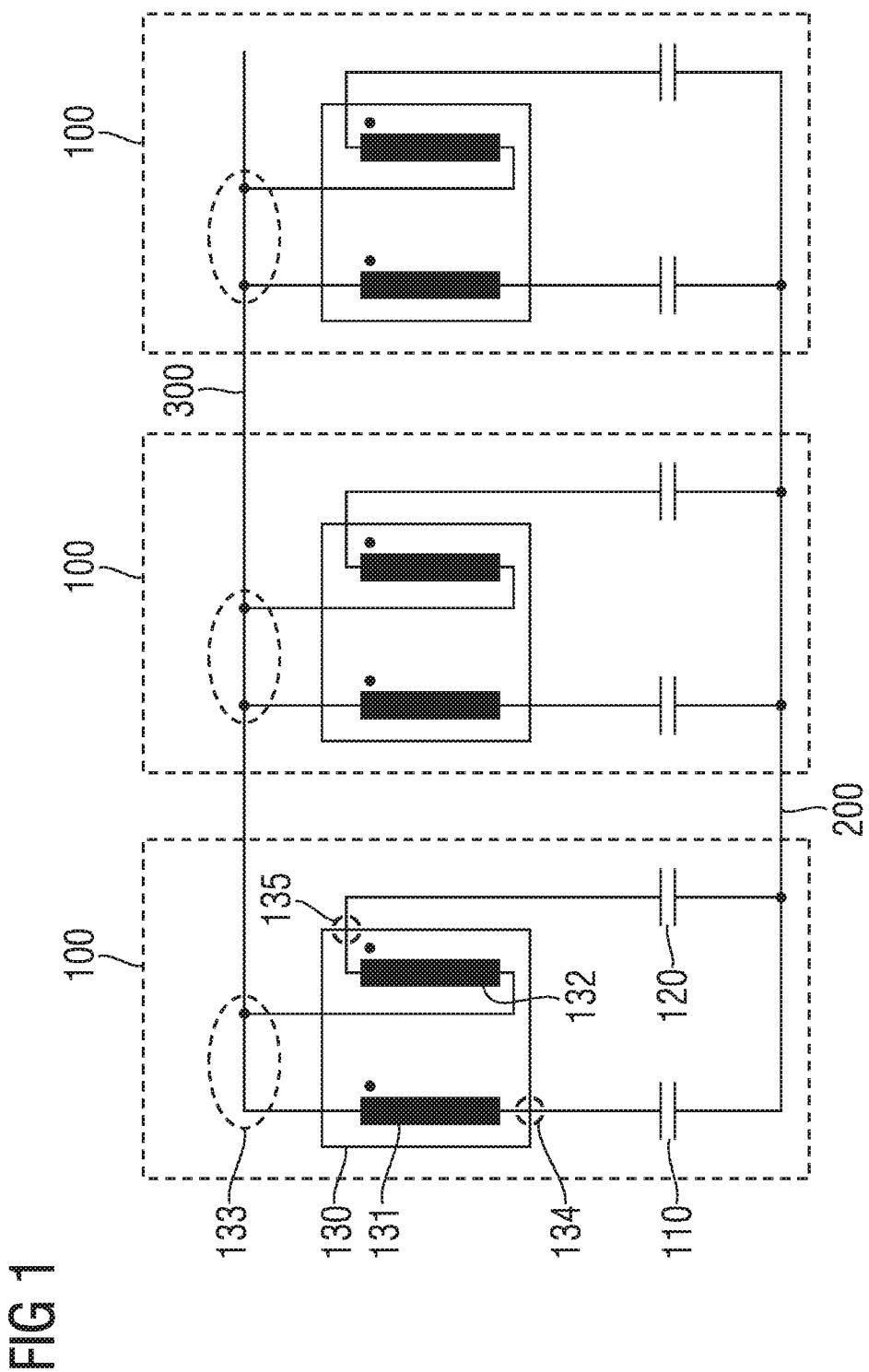
FIG. 1 is a schematic illustration of an arrangement comprising three capacitor systems constructed in accordance with an embodiment of the present invention.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In accordance with one embodiment of the present invention, there is provided a capacitor system comprising a first capacitor and a second capacitor having essentially the same capacitance and a current limiter. A first terminal of the first capacitor and a first terminal of the second capacitor are connectable to a first busbar. The second terminal of the first capacitor is coupled to a first terminal of the current limiter and the second terminal of the second capacitor is coupled to a second terminal of the current limiter. The current limiter has at least one third terminal connectable to a second busbar and comprises a first inductive element and a second inductive element having essentially the same inductance and being magnetically coupled with opposite polarity.

At least one embodiment of the present invention relates to a subsea electrical system comprising at least one such capacitor system immersed in a pressure compensated oil volume contained within a vessel or enclosure.

In an example embodiment of the invention, a first terminal of the first inductive element is connected to the at least one third terminal of the current limiter and the second terminal of the first inductive element is connected to the first terminal of the current limiter while a first terminal of the second inductive element is connected to the second terminal of the current limiter and the second terminal of the second inductive element is connected to the at least one third terminal of the current limiter.

In embodiments of the present invention first and/or second capacitor is a group of capacitors connected in parallel.

The first and second inductive elements may for example be coupled air core coils or planar windings. Planar windings may for example be arranged in separate layers of a printed circuit board.

In an example embodiment the capacitors are of the metalized film type to facilitate self-healing.

Referring to FIG. 1 there is shown an example electrical system comprising three capacitor systems 100 constructed in accordance with an embodiment of the present invention which are connected to a first busbar 200 and a second busbar 300. Without loss of generality the first busbar 200 may bear ground potential and the second busbar 300 may be a DC-link busbar bearing the operating voltage.

A capacitor system 100 in accordance with an embodiment of the present invention comprises two capacitors 110 and 120 having essentially the same capacitance. Capacitors 110 and 120 may be single capacitors as shown in FIG. 1 or may be constructed by connecting groups of capacitors in parallel (not shown). Capacitor system 100 further comprises a current limiter 130 comprising two inductors 131 and 132 which are coupled magnetically wherein the polarity of two inductors 131 and 132 is opposite.

In more detail, a first terminal of first capacitor 110 and a first terminal of second capacitor 120 are connected to a first terminal of capacitor system 100 which in turn is connected to first busbar 200.

The second terminal of first capacitor 110 is coupled to a first terminal 134 of current limiter 130 and the second terminal of second capacitor 120 is coupled to a second terminal of current limiter 130.

Current limiter 130 has at least one third terminal 133 (which forms the second terminal of capacitor system 100) which is connected to second busbar 300. Current limiter 130 comprises a first inductive element 131 and a second inductive element 132 being magnetically coupled with opposite polarity and preferably having essentially the same inductance.

An example implementation of capacitor system 100 could also be described as a parallel connection of two subsystems each composed of an inductor 131, 132 and a capacitor 110, 120 in series wherein the inductance of the inductors and the capacitance of the capacitors are essentially equal and wherein the inductors are magnetically coupled with opposite polarity.

In normal operation of capacitor system 100 the common mode currents in inductors 131, 132 elements will compensate each other because of the opposite polarity of inductors 131, 132. Thus the presence of inductors 131, 132 will have little or no influence, including EMI, on the impedance between the capacitors 110, 120 and other circuitry connected to busbars 200, 300.

On the other hand in case of a failure for example in first capacitor 110 the failure current into this faulty capacitor will be high and there will be a contribution current from second capacitor 120. This contribution current "sees" the two inductors 131, 132 in series with the same polarity and thus the impedance will be high. Consequently the magnitude of the fault current will be limited by current limiter 130 while the regular currents will not or only minimally be affected.

In other words current limiter 130 has selective impedance depending on the current flow.

A capacitor system 100 comprising such current limiter 130 is particularly useful if the capacitors are of the metalized film type as it limits the failure current and thus facilitates the self-healing process, prevents destruction of the failed capacitor and consequently ensures the continued operation of the capacitor. The latter is particularly important in environments where failed capacitors can only be retrieved and replaced at high cost, for example in subsea power grids. For such applications the additional cost of two magnetically coupled inductors is more than acceptable.

The inductive elements 131, 132 may in embodiments be well-known wire coils preferably sharing the same magnetic or air core (not shown) but being arranged such that their polarity is opposite. Opposite polarity here means that in the normal operation of current limiter 130 the current flow through inductive elements 131, 132 is such that the corresponding magnetic fluxes are of opposite polarity such that ideally there is no resulting magnetic field outside of current limiter 130. For example inductive elements 131, 132 may be coils whose turns are arranged in opposite directions around a shared (air) core wherein inductive elements 131, 132 share one terminal on the same side/end of the core. Alternatively, inductive elements may be coils whose turns are arranged in the same direction around a shared core wherein one terminal of the first inductive element is coupled to the terminal of the second inductive element located at the opposite side/end of the core to form common terminal 133.

In other embodiments inductive elements 131, 132 may comprise planar windings preferably sharing the same magnetic or air core and preferably arranged in separate layers of a printed circuit board as shown in FIGS. 2A-2D.

In FIG. 2A a current limiter 130 suitable for smaller currents is shown in detail. FIG. 2A shows the assembled three-layer current limiter 130, and FIGS. 2B, 2C and 2D show the individual layers.

FIG. 2B shows first inductive element 131 comprising a first (common) terminal 133 in the center of first inductive element 131, and a planar winding which extends spirally clockwise from first terminal 133 to second terminal 134 of first inductive element 131.

FIG. 2C shows an insulating layer of a printed circuit board.

FIG. 2D shows second inductive element 132 comprising a first (common) terminal 133 in the center of second inductive element 132, and a planar winding which extends spirally counterclockwise from first terminal 133 to second terminal 135 of second inductive element 132.

Inductive elements 131, 132 share center terminal 133 and are arranged in concentric fashion as shown in FIG. 2A. The connection of both first terminals 133 of inductive elements 131, 132 may for example be standard via (not shown) extending from the layer shown in FIG. 2B through the insulating layer shown in FIG. 2C to the layer shown in FIG. 2D.

Arranging one of the windings clockwise and the other winding counterclockwise achieves the desired opposite polarity of inductive elements 131, 132.

While embodiments of the present invention are particularly useful for use with metalized film type capacitors and in the subsea environment, embodiments may of course be applied in many other contexts where capacitors connected in parallel are required and where the current flow from a capacitor to its neighbor needs to be limited, for example in case of a fault.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A capacitor system, comprising:
  a first capacitor;
  a second capacitor, the first capacitor and the second capacitor having essentially a same capacitance; and
  a current limiter, wherein
    a first terminal of the first capacitor and a first terminal of the second capacitor are connectable to a first busbar,
    a second terminal of the first capacitor is coupled to a first terminal of the current limiter,
    a second terminal of the second capacitor is coupled to a second terminal of the current limiter and
    the current limiter includes at least one third terminal, a first inductive element and a second inductive element, the at least one third terminal being connectable to a second busbar and the first inductive element and the second inductive element having essentially a same inductance and being magnetically coupled with opposite polarity.

2. The capacitor system of claim 1, wherein
  a first terminal of the first inductive element is connected to the at least one third terminal of the current limiter and a second terminal of the first inductive element is connected to the first terminal of the current limiter; and
  a first terminal of the second inductive element is connected to the second terminal of the current limiter and a second terminal of the second inductive element is connected to the at least one third terminal of the current limiter.

3. The capacitor system of claim 1, wherein the capacitor system includes a group of capacitors connected in parallel, the group of capacitors including the first capacitor.

4. The capacitor system of claim 1, wherein the capacitor system includes a group of capacitors connected in parallel, the group of capacitors including the second capacitor.

5. The capacitor system of claim 1, wherein the first and second inductive elements are coupled air core coils.

6. The capacitor system of claim 1, wherein the first and second inductive elements are planar windings.

7. The capacitor system of claim 6, wherein the planar windings are arranged in separate layers of a printed circuit board.

8. The capacitor system of claim 1, wherein the first and second capacitors are of the metalized film type.

9. A subsea electrical system comprising:
  at least one capacitor system, the at least one capacitor system including the capacitor system of claim 1, immersed in a pressure compensated oil volume contained within a vessel or enclosure.

10. The capacitor system of claim 2, wherein the capacitor system includes a group of capacitors connected in parallel, the group of capacitors including the first capacitor.

11. The capacitor system of claim 2, wherein the capacitor system includes a group of capacitors connected in parallel, the group of capacitors including the second capacitor.

12. The capacitor system of claim 3, wherein the capacitor system includes a group of capacitors connected in parallel, the group of capacitors including the second capacitor.

13. The capacitor system of claim 10, wherein the capacitor system includes a group of capacitors connected in parallel, the group of capacitors including the second capacitor.

14. The capacitor system of claim 2, wherein the first and second inductive elements are coupled air core coils.

15. The capacitor system of claim 2, wherein the first and second inductive elements are planar windings.

16. The capacitor system of claim 15, wherein the planar windings are arranged in separate layers of a printed circuit board.

17. A subsea electrical system comprising:
  at least one capacitor system, the at least one capacitor system including the capacitor system of claim 2, immersed in a pressure compensated oil volume contained within a vessel or enclosure.

18. A subsea electrical system comprising:
  at least one capacitor system, the at least one capacitor system including the capacitor system of claim 3, immersed in a pressure compensated oil volume contained within a vessel or enclosure.

19. A subsea electrical system comprising:
  at least one capacitor system, the at least one capacitor system including the capacitor system of claim 4, immersed in a pressure compensated oil volume contained within a vessel or enclosure.

\* \* \* \* \*